(12) United States Patent
Verstak et al.

(10) Patent No.: US 9,779,072 B1
(45) Date of Patent: Oct. 3, 2017

(54) IDENTIFYING A PRIMARY VERSION OF A DOCUMENT

(71) Applicant: Google Inc., Mountain View, CA (US)

(72) Inventors: Alexandre A. Verstak, Cupertino, CA (US); Anurag Acharya, Campbell, CA (US)

(73) Assignee: Google Inc., Mountain View, CA (US)

( * ) Notice: Subject to any disclaimer, the term of this patent is extended or adjusted under 35 U.S.C. 154(b) by 557 days.

(21) Appl. No.: 13/955,180

(22) Filed: Jul. 31, 2013

Related U.S. Application Data

(63) Continuation of application No. 13/346,436, filed on Jan. 9, 2012, now Pat. No. 8,522,129, which is a continuation of application No. 11/283,328, filed on Nov. 18, 2005, now Pat. No. 8,095,876.

(51) Int. Cl.
*G06F 17/00* (2006.01)
*G06F 17/22* (2006.01)
*G06F 17/30* (2006.01)

(52) U.S. Cl.
CPC ...... *G06F 17/2288* (2013.01); *G06F 17/3023* (2013.01); *G06F 17/30067* (2013.01); *G06F 17/30309* (2013.01); *G06F 17/30548* (2013.01)

(58) Field of Classification Search
CPC ............... G06F 17/24; G06F 17/30011; G06F 17/2288; G06F 17/30309; G06F 17/30067; G06F 17/3023; G06F 8/71; G06F 9/44536
See application file for complete search history.

(56) References Cited

U.S. PATENT DOCUMENTS

| | | | |
|---|---|---|---|
| 6,285,999 B1 | 9/2001 | Page | |
| 6,499,026 B1 | 12/2002 | Rivette et al. | |
| 6,546,388 B1 * | 4/2003 | Edlund | G06F 17/30864 |
| 6,748,387 B2 | 6/2004 | Garber et al. | |
| 6,823,348 B2 * | 11/2004 | Michel | G06F 17/30067 |
| 7,386,532 B2 * | 6/2008 | Kiessig | G06F 17/30067 |
| 8,095,876 B1 | 1/2012 | Verstak et al. | |
| 2002/0007285 A1 * | 1/2002 | Rappaport | G06F 19/322 705/2 |
| 2002/0016787 A1 * | 2/2002 | Kanno | G06F 17/3061 |
| 2002/0065857 A1 | 5/2002 | Michalewicz et al. | |
| 2002/0152238 A1 | 10/2002 | Hayes | |
| 2003/0001873 A1 | 1/2003 | Garfield et al. | |
| 2003/0046307 A1 | 3/2003 | Rivette et al. | |
| 2003/0164849 A1 | 9/2003 | Barrie et al. | |
| 2004/0059584 A1 | 3/2004 | Yoon et al. | |
| 2004/0068697 A1 | 4/2004 | Harik et al. | |
| 2004/0194036 A1 | 9/2004 | Wolska et al. | |
| 2004/0199865 A1 | 10/2004 | Bie et al. | |
| 2004/0205448 A1 | 10/2004 | Grefenstette et al. | |

(Continued)

OTHER PUBLICATIONS

Mike Thelwall et al., "New versions of PageRank employing alternative Web document models", 2004, ASLIB Proceedings, pp. 12.*

(Continued)

*Primary Examiner* — Chau Nguyen
(74) *Attorney, Agent, or Firm* — Fish & Richardson P.C.

(57) ABSTRACT

A system and method identifies a primary version out of different versions of the same document. The system selects a priority of authority for each document version based on a priority rule and information associated with the document version, and selects a primary version based on the priority of authority and information associated with the document version.

23 Claims, 3 Drawing Sheets

(56) References Cited

U.S. PATENT DOCUMENTS

| | | |
|---|---|---|
| 2004/0205539 A1 | 10/2004 | Mak et al. |
| 2004/0249801 A1 | 12/2004 | Kapur |
| 2005/0165747 A1* | 7/2005 | Bargeron .......... G06F 17/30011 |
| 2005/0262430 A1 | 11/2005 | Croft |
| 2006/0041590 A1 | 2/2006 | King et al. |
| 2006/0059121 A1* | 3/2006 | Zhang ............... G06F 17/30722 |
| 2006/0095421 A1* | 5/2006 | Nagai ............... G06F 17/30722 |
| 2006/0095857 A1 | 5/2006 | Torvinen |
| 2006/0104515 A1 | 5/2006 | King et al. |
| 2006/0224626 A1* | 10/2006 | Lakshminath ...... G06F 17/3023 |
| 2008/0077570 A1 | 3/2008 | Tang et al. |

OTHER PUBLICATIONS

Lin Guo et al. "Xrank: Ranked Keyword Search over XML Documents", Department of Computer Science—Cornell University, Sigmod 2003, Jun. 9-12, 2003, San Diego, CA, Copyright 2003 ACM, pp. 12.*

Ding, C. et al.: PageRank, HITS and a Unified Framework for Link Analysis; Proceeding SIGIR '02. Proceedings of the 25th annual international ACM SIGIR conference on research and development in information retrieval; pp. 353-354.

Amento, B. et al.: Does "Authority" Mean Quality? Predicting Expert Quality Ratings of Web Documents; Proceeding SIGIR '00. Proceedings of the 23rd annual international ACM SIGIR conference on Research and development in information retrieval; pp. 296-303.

Kleinberg J.: Authoritative sources in a hyperlinked environment; Journal of the ACM (JACM) vol. 46, Issue 5, Sep. 1999. pp. 604-632.

Co-pending U.S. Appl. No. 13/346,436 entitled "Identifying a Primary Version of a Document", filed Jan. 9, 2012. 23 pages.

\* cited by examiner

US 9,779,072 B1

IDENTIFYING A PRIMARY VERSION OF A DOCUMENT

CROSS-REFERENCE TO RELATED PATENT APPLICATION

The application is a continuation of application Ser. No. 13/346,436, filed Jan. 9, 2012, which is a continuation of application Ser. No. 11/283,328, filed on Nov. 18, 2005, now U.S. Pat. No. 8,095,876. The disclosures of both applications are incorporated herein by reference.

FIELD OF THE INVENTION

The present indention relates generally to information retrieval systems, in particular to identifying a primary version of a document from among a number of different versions of the document.

BACKGROUND OF THE INVENTION

Information retrieval systems, generally called search engines, are used to search large collections of documents. In some information retrieval systems, documents are added under the supervision of editors or others to ensure that only one version of a document with multiple different versions is introduced into the document collection. However, for search engines operating on the Internet, there is no such supervisory control. Accordingly, it is typical that a particular document or portion thereof, appears in a number of deferent versions or forms in various online repositories. This generally results in multiple versions of a document being included in the search results for any given query. Because the inclusion of different versions of the same document does not provide additional useful information, this increase in the number of the search results does not benefit users. Also, search results including different versions of the same document may crowd out diverse contents that should be included. Furthermore, where there are multiple different versions of a document present in the search results, the user may not know which version is most authoritative, complete, or best to access, and thus may waste time accessing the different versions in order to compare them. These problems have seriously affected the quality of search results provided by a search engine.

For these reasons, it would be desirable to identify a primary version out of different versions of the same document in a document collection. It would also be desirable to use the primary version to represent the document such that the search engine can furnish the most appropriate and reliable search result.

SUMMARY OF THE INVENTION

A primary version of a document is identified from multiple different versions of the document by assigning a priority of authority to the different versions. The priority of authority is assigned according to a priority rule. The primary version is determined by the assigned priority of authority and other information associated with each document version.

One method of identifying a primary version is as follows. Different versions of a document are identified from a number of different sources, such as online databases, websites, and library data systems. For each document version, a priority of authority is selected based on the metadata information associated with the document version, such as the source, exclusive right to publish, licensing right, citation information, keywords, page rank, and the like. The document versions are then determined for length qualification using a length measure. The version with a high priority of authority and a qualified length is deemed the primary version of the document. If none of the document versions has both a high priority and a qualified length, then the primary version is selected based on the totality of information associated with each document version.

These features are not the only features of the invention. In view of the drawings, specification, and claims, many additional features and advantages will be apparent.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

System Architecture

Figure 1:
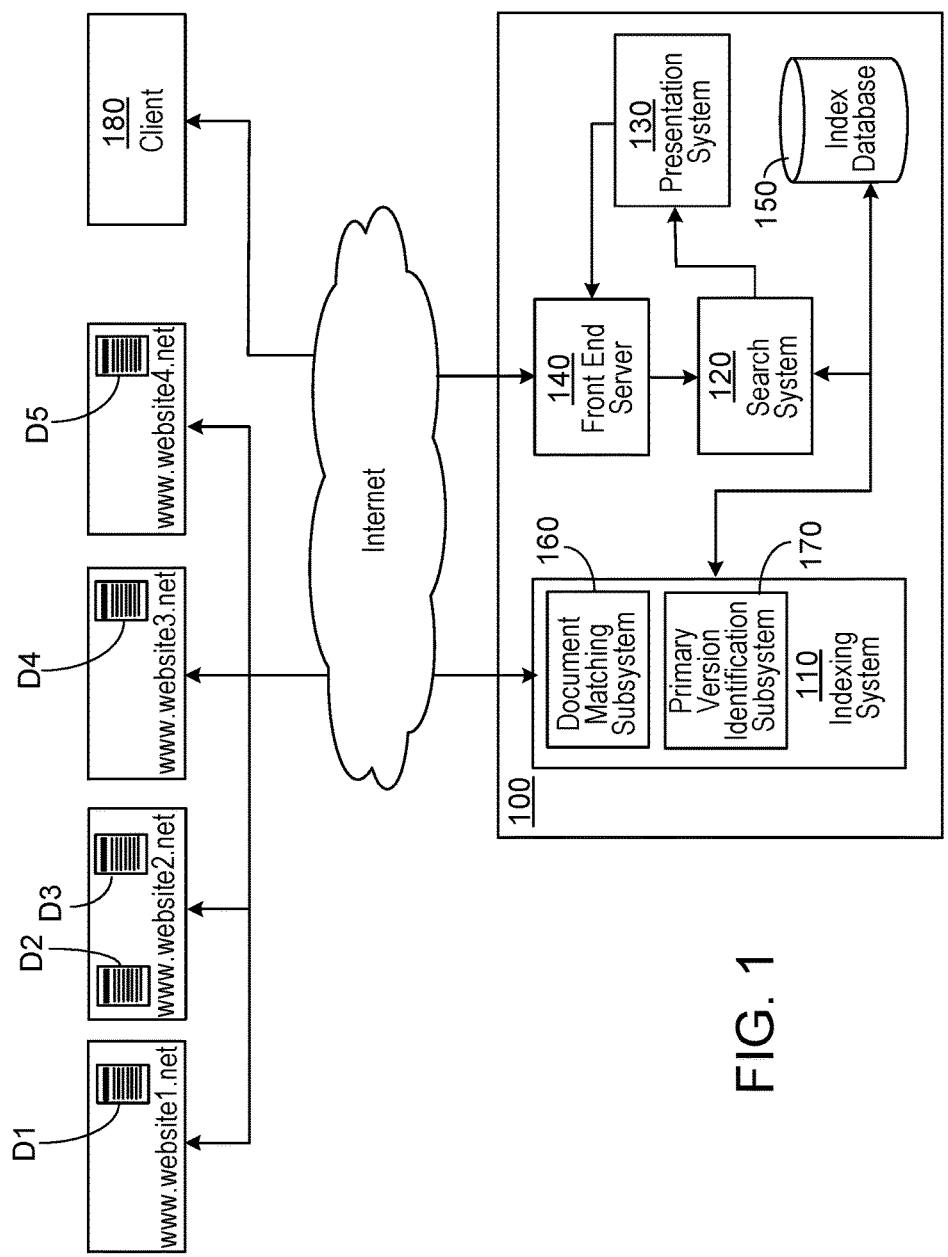
FIG. 1 is a block diagram of the software architecture of one embodiment of the present invention.

Referring to FIG. 1, there is shown the software architecture of a search engine system 100 in accordance with one embodiment of present invention. In this embodiment, the search engine system 100 includes an indexing system 110, a search system 120, a presentation system 130, and a front end server 140.

The indexing system 110 includes a version matching subsystem 160 and a primary version identification subsystem 170. The indexing system 110 identifies contents of documents, organizes the documents through the matching subsystem 160 and identification subsystem 170, calculating page ranks of the documents, and indexes the documents according to their contents, by accessing various documents such as D1-D5 at websites on the Internet, which may store the documents in directories, databases, or any other data repository. The matching subsystem 160 identifies different versions of the same document. The identification subsystem 170 identifies one primary version for each document with multiple versions. The front end server 140 receives queries from a user of a client 180, and provides those queries to the search system 120. The search system 120 searches for documents relevant to the search query, and ranks the documents in the search results. The search system 120 provides the search results to the presentation system 130. The presentation system 130 modifies the search results, and provides the modified search results back to the front end server 140, which provides the results to the client 180. The search engine system 100 further includes an index database 150 that stores the indexing information pertaining to documents.

Because works of scholarly literature are subject to rigorous format requirements, documents such as journal articles, conference articles, academic papers and citation records of journal articles, conference articles, and academic papers have metadata information describing the content and source of the document. As a result, works of scholarly literature are good candidates for the identification subsystem 170.

Overview of Methodology

Figure 2:
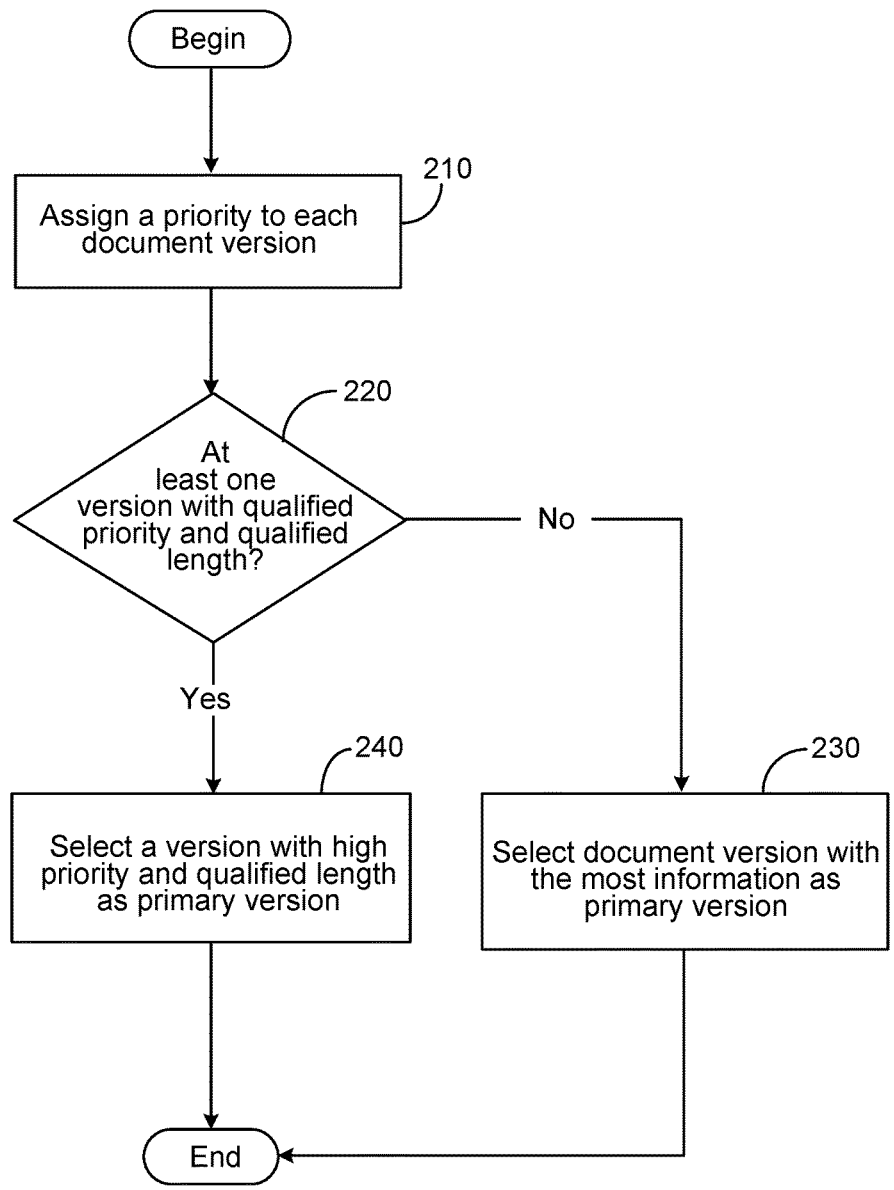
FIG. 2 is a flowchart of exemplary processing for identifying a primary version in accordance with the present invention.

Referring to FIG. 2, there is shown a flowchart of an exemplary methodology for identifying a primary version out of different versions of the same document in accordance with the present invention. The process illustrated in FIG. 2 may be implemented in software, hardware, or a combination of hardware and software.

The process illustrated in FIG. 2 commences with a set of different versions that have been collected by the indexing system, all versions in the set are of the same document. In one embodiment, the document versions that are deemed to be versions of the same document can be determined according to the method described in the related application, identified above. Each document version has metadata information describing the content and source of the version. An example of the set of document versions is as follows.

| Document ID | Source | Length (Byte) | Citation Count | Reference Count | Last Modified |
|---|---|---|---|---|---|
| D1 | www.website1.com | 16,724 | 29 | 32 | Jul. 3, 1974 |
| D2 | www.website2.net | 15,637 | 36 | 25 | Jan. 1, 1980 |
| D3 | www.website2.net | 678 | 79 | 0 | Mar. 7, 1980 |
| D4 | www.website3.com | 15,637 | 3 | 25 | Jan. 1, 1980 |
| D5 | www.website4.com | 14,978 | 27 | 34 | Dec. 5, 1973 |

Documents D2 and D3 are from the same source, www.website2.net. D2 is the full-text version of the document, and D3 is the abstract of the document. Document D4 is a mirror image copy of D2, and thus is also full-text. Documents D1 and D5 are two different versions of the document, D1 being a more lengthy version, and D5 being a shorter version. In practice, the number of different versions of the same document collected during an indexing pass can be anywhere from a couple, to tens, or more. In addition, different versions of a document may be collected during different indexing passes.

The identification subsystem 170 assigns 210 a priority of authority to each document version based on a priority rule and document metadata associated with the document version. The document metadata includes author names, title, publisher, publication date, publication location, keywords, page rank, citation information, article identifiers such as Digital Object Identifier, PubMed Identifier, SICI, ISBN, and the like, network locution (e.g., URL), reference count, citation count, language, and so forth. The priority rule generates a numeric value (e.g., a score) to reflect the authoritativeness, completeness, or best to access of a document version. In one example, the priority rule determines the priority of authority assigned to a document version by the source of the document version based on a source-priority list. The source-priority list comprises a list of sources, each source having a corresponding priority of authority. The priority of a source can be based on editorial selection, including consideration of extrinsic factors such as reputation of the source, size of source's publication corpus, recency or frequency of updates, or any other factors. Each document version is thus associated with a priority of authority; this association can be maintained in a table, tree, or other data structures.

The table below illustrates the source-priority list and the resultant exemplary set of document versions after applying the above priority rule.

| Source-Priority List | |
|---|---|
| Source | Priority |
| www.website1.com | 1 |
| www.website2.net | 3 |
| www.website3.com | 2 |
| www.website4.com | 1 |

| Document ID | Source | Priority |
|---|---|---|
| D1 | www.website1.com | 1 |
| D2 | www.website2.net | 3 |
| D3 | www.website2.net | 3 |
| D4 | www.website3.com | 2 |
| D5 | www.website4.com | 1 |

Alternatively, the priority rule determines the priority of authority assigned to a document version based on the kind of publication right the source of the version has of the document. The information about publication right the source of the version has of the document can be found in the metadata associated with the version. Alternatively, the information about publication right can be found in a document-right holder list containing documents and corresponding publication right holders. The document-right holder list can be compiled from copyright/ownership registries, or from bibliographic citations of the document versions. The versions from sources with exclusive publication right of the document are assigned a high priority of authority. The versions from sources with licensing rights of the document are assigned a lower priority of authority. The versions from other sources are assigned even lower priorities of authority.

The identification subsystem 170 determines 220 whether there is any document version having both a qualified priority based on a priority measure and a qualified length based on a length measure. Assuming such document versions exist, the identification subsystem 170 selects 240 one of them as the primary version. Where multiple document versions quality as a primary version, the identification subsystem can select the first such document version as the primary version, or select a document version from the qualified document versions based on information associated with the document version, such as page rank, priority of authority, length, and the like.

The priority measure for determining whether a document version has a qualified priority can be based on a qualified priority value. A qualified priority value is a threshold to determine whether a document version is authoritative, complete, or easy to access, depending on the priority rule. When the assigned priority of a document version is greater than or equal to the qualified priority value, the document is deemed to be authoritative, complete, or easy to access, depending on the priority rule. Alternatively, the qualified priority can be based on a relative measure, such as given the priorities of a set of document versions, only the highest priority is deemed as qualified priority.

The length measure can be determined by comparing the length of a document version to a minimum length threshold. The minimum length can be expressed in a number of ways, such as the number of bits, bytes, characters, words, lines, paragraphs, pages, and the like. This minimum length is chosen to prefer full-text document versions over versions that are abstracts or briefs, so that document versions with length longer than the minimum length threshold are deemed full-text versions, while document versions with length equal to or shorter than the minimum length threshold are deemed abstracts or briefs. Alternatively, the qualified length can be determined by the metadata associated with the document version. If a metadata element describes the associated document version as full-text or unabridged, the length measure deems the length of that document version as qualified, regardless of the length of the document version compared to the minimum length threshold.

For example, the priority of a document version is qualified where priority of the version equals the highest priority among the available document versions, and the length of a document version is qualified where it exceeds a minimum length of 3,000 bytes. Out of documents D1-D5, the identification subsystem 170 selects D2 as the primary version because it both has a highest priority (3) and has a length longer than 3,000 bytes (15,637). Document version D3 is not selected as the primary version because it does not have a qualified length.

Where none of the document versions has both qualified priority and qualified length, the identification subsystem 170 selects 230 the primary version of the document as the version with the most information based on an information measure.

The information measure for selecting a document version with the most information can be based on metadata information associated with the document version, such as the document length, citation count, reference count, and last modification time, and the like.

For example, the information measure can be the length of the document version, and thus the primary version is the document version with the greatest length. As discussed above, the length of a document version can be determined in a number of ways. Assuming the information measure is the length of the document version in terms of bytes, the identification subsystem 170 selects D1 as the primary version because it has the greatest length in bytes (16,724). Note that the priority of authority associated with document version D1 being low is not considered at this stage, because the identification subsystem 170 selects 230 the primary version based on the total information associated with the version, not priority of authority.

Alternatively, the information measure can be based on the number of other documents cited in the document version, the reference count of the document version, and thus the primary version is the document version with the greatest reference count. Using this information measure, the identification subsystem 170 selects D5 as the primary version because it has the greatest reference count (34).

In another example, the information measure is based on the citation count and the length of the document version, and thus the primary version is the document version with the greatest citation count among the document versions with a qualified length. Using this information measure, the identification subsystem 170 selects D2 as primary version because it has the greatest citation count (36) among the documents with a qualified length (D1, D2, D4, D5).

Alternatively, the information measure can be determined by the modification time and the length of the document version, and thus the primary version is the document version with the latest modification time among the document versions with a qualified length. Under these circumstances, the identification subsystem 170 can select either D2 or D4 as primary version because both document versions have a qualified length (15,637) and a latest modification time (Jan. 1, 1980). Where multiple document versions qualify as a primary version, the identification subsystem can select the first such document version as the primary version, or select a document version from the qualified document versions based on information associated with the document version, such as page rank, priority of authority, length, and the like.

In another example, the information measure is based on the page rank and the length of the document version, and thus the primary version is the document version with the greatest page rank among the document versions with a qualified length. A page rank is a measure of the importance of a document version determined by other documents referring to the document version. A method of determining page rank is disclosed in U.S. Pat. No. 6,285,999, titled "Method for Node Ranking in a Linked Database," assigned to the same assignee as the present invention and incorporated herein by reference. The page rank information can be determined by the metadata associated with the document version.

The identification subsystem 170 calculates the citation count of the document by adding the citation count of all document versions of the document. Each document version has metadata information describing the citation count of the document version. In the example illustrated above, the subsystem 160 calculates the citation count for the document by adding the citation counts of the different document versions D1-D5, thus the citation count for the document is 174. Calculates the citation count of the document is advantageous because the citation number is often reflective of the importance, significance, or quality of the document. Provided a citation of the document, a user can have an accurate assessment of the actual significance, importance or quality of the document based on the citation count.

User Interface

Figure 3:
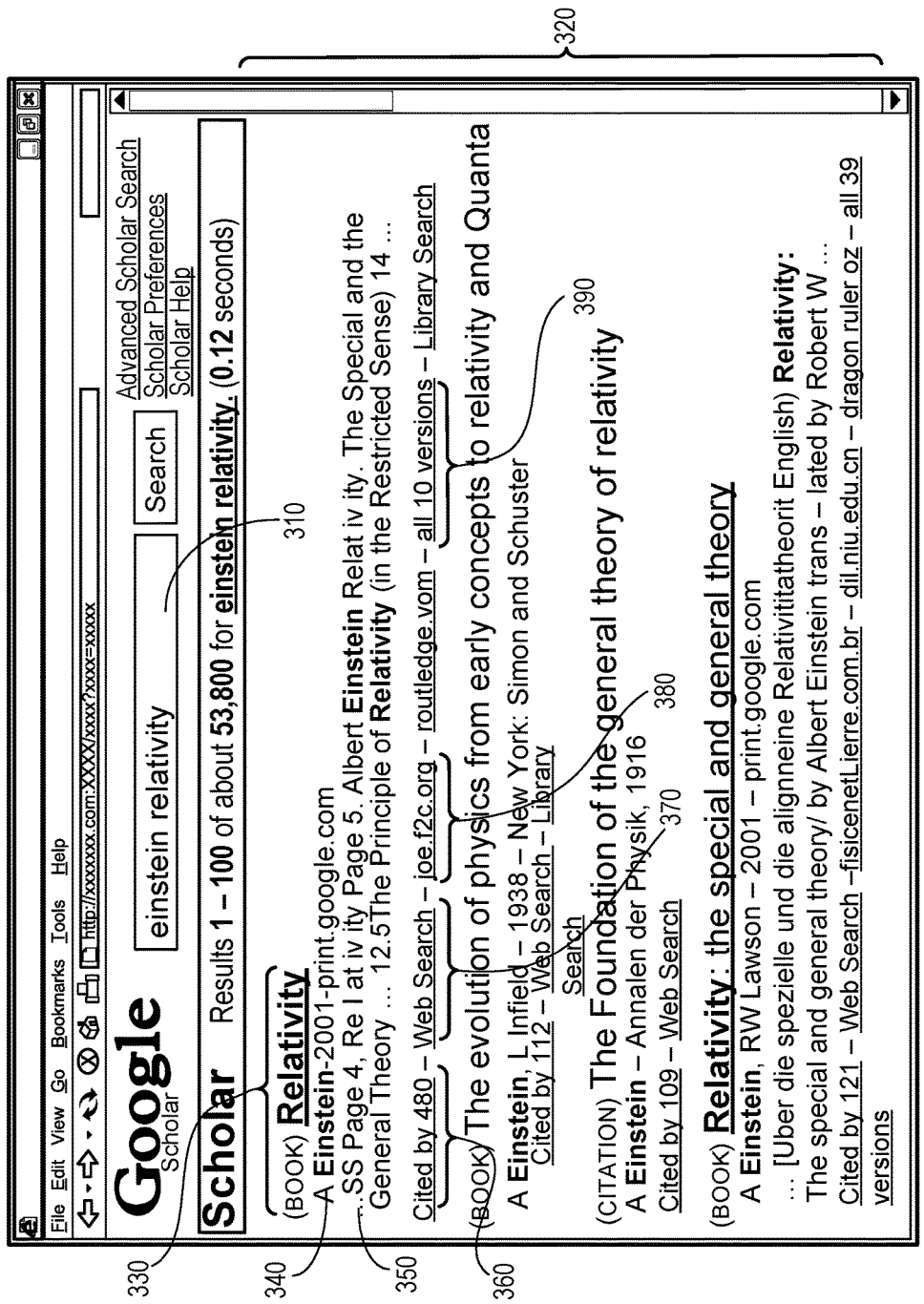
FIG. 3 is a screenshot of an interface for an application displaying search results including primary versions identified by an implementation consistent with the principles of the present invention.

FIG. 3 is a screenshot of a user interface for an application (e.g., a browser) displaying a set of search results provided by a search engine system 100 in response to a search query. For each search result, a primary version is selected by an implementation consistent with the principles of the present invention and indicated in the display. The user interface includes a search query field 310, which accepts queries from a user, and a display area 320 for displaying search results of the query.

As a user enters a search term into the search query field 310, the query is submitted to the front end server 140, which forwards the query to the search system 120. The search system 120 searches for documents relevant to the query, and provides the search results back to the front end server 140 through the presentation system 130. The front end server 140 provides the search results to the browser, which displays the search results. The search results received by the browser includes the primary version for each document in the search result set, along with links to some number of the other versions of the document (if any). The number of results displayed in the display area 320 may be limited. The maximum number of results that can be shown in the display area 320 can be set according to user preferences.

When one resulting document has multiple versions, the document title 330 is displayed as a hyperlink, associated with the network address of the primary version of the document. This makes it easier for a user to access the most authorized and complete version of the resulting document, without having to review and individually consider each of the different versions of the document.

Below the document title 330, certain portions of publishing information 340 are displayed. The publishing information comprises the first author's name, the year of publishing, and the name of the publisher, though other publication metadata can be shown as well. A snippet 350 of the primary version of the document is displayed below the publication information 340. The search terms used in the search query are highlighted in bold font in the document title 330 and the snippet 350.

Below the snippet 350, the total number 360 of documents citing the all version of the document (the total citation count) is displayed as hyperlink, which is associated with a list of the documents citing any of the versions associated with the primary version of the document. The total citation count is often reflective of the importance, significance, or quality of the document. By providing a total citation count for all versions of the document, a user can have an accurate and quick assessment of the actual significance, importance or quality of the document, as compared with only an limited sense of the document from the citation count for any one version.

Also below the snippet 350, a search link 370 for a query to the search engine system to retrieve additional results in which the particular document may appear, for example, as being mentioned in a web page or other document. When the user selects the search link 370, a query with the author's name and keywords of the document title is submitted to the front end server 140, and the user interface will display the search result of that query. By providing such a link, a user can easily search for more documents related to the resulting document.

Also below the snippet 350, links to one or more of the other document versions 380 are shown, with the link being labeled with the source domain of each of other document version. Displaying the source domain of the other versions allows the user to decide whether another version is more favorable, such as better accessibility (e.g., in a subscription database to which the user has access). Another link 390 is provided to access a list of all document versions as well.

This user interface is advantageous in that instead of listing all versions of the same document in search results including the document, only a primary version is listed, together with links to all other versions. As a result, the user interface can accommodate more diverse result contents without sacrificing the totality of the result information.

The present invention has been described in particular detail with respect to one possible embodiment. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present the feature of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or code devices, without loss of generality.

The present invention also relates to any method, computer program product, system or apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description above. In addition, the present invention is not described with reference to any particular programming language. It is appreciated that a variety of programming languages may be used to implement the teachings of the present invention as described herein, and any references to specific languages are provided for disclosure of enablement and best mode of the present invention.

The present invention is well-suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A method comprising:
   identifying, by a computer system, a plurality of different document versions of a particular document;
   identifying, by the computer system, a first type of metadata that is associated with each document version of the plurality of different document versions, wherein the first type of metadata includes data that describes a source that provides each document version of the plurality of different document versions;
   identifying, by the computer system, a second type of metadata that is associated with each document version of the plurality of different document versions, wherein the second type of metadata describes a feature of each document version of the plurality of different document versions other than the source of the document version;

for each document version of the plurality of different document versions, applying, by the computer system, a priority rule to the first type of metadata and the second type of metadata, to generate a priority value;

selecting, by the computer system, a particular document version, of the plurality of different document versions, based on the priority values generated for each document version of the plurality of different document versions; and providing, by the computer system, the particular document version for presentation.

2. The method of claim 1, wherein selecting the particular document version comprises:

selecting the particular document version when a length of the particular document version exceeds a threshold length.

3. The method of claim 1, wherein selecting the particular document version comprises:

selecting the particular document version when the priority level of the particular document version exceeds a threshold priority level.

4. The method of claim 1, wherein applying a priority rule comprises:

identifying a priority associated with the source of each document version of the plurality of different document versions, and determining the priority value for each document version of the plurality of different document versions based on the identified priority associated with the source of each document version of the plurality of document versions.

5. The method of claim 4, wherein identifying the priority associated with the sources of each document version of the plurality of different document versions comprises:

performing a lookup in a memory to identify the priority associated with each respective source of each respective document version of the plurality of different document versions.

6. The method of claim 4, wherein the priority associated with a particular one of the sources is based on a reputation of the particular one of the sources.

7. The method of claim 1, wherein the second type of metadata includes at least one of:

information identifying an author associated with the particular document version, information identifying a title associated with the particular document version, information identifying a publisher associated with the particular document version, a rank of the particular document version, or a quantity of other documents cited in the particular document version.

8. The method of claim 1, wherein the first type of metadata includes an address of a server that provides each document version of the plurality of different versions.

9. A system comprising one or more computers and one or more non-transitory computer-readable storage devices storing instructions that are operable, when executed by the one or more computers, to cause the one or more computers to perform operations comprising:

identifying a plurality of different document versions of a particular document;

identifying a first type of metadata that is associated with each document version of the plurality of different document versions, wherein the first type of metadata includes data that describes a source that provides each document version of the plurality of different document versions;

identifying, by the computer system, a second type of metadata that is associated with each document version of the plurality of different document versions, wherein the second type of metadata describes a feature of each document version of the plurality of different document versions other than the source of the document version;

for each document version of the plurality of different document versions, applying a priority rule to the first type of metadata and the second type of metadata, to generate a priority value;

selecting a particular document version, of the plurality of different document versions, based on the priority values generated for each document version of the plurality of different document versions; and providing the particular document version for presentation.

10. The system of claim 9, wherein selecting the particular document version comprises:

selecting the particular document version when a length of the particular document version exceeds a threshold length.

11. The system of claim 9, wherein selecting the particular document version comprises:

selecting the particular document version when the priority level of the particular document version exceeds a threshold priority level.

12. The system of claim 9, wherein applying the priority rule comprises:

identifying a priority associated with the source of each document version of the plurality of different document versions; and determining the priority value for each document version of the plurality of different document versions based on the identified priority associated with the source of each document version of the plurality of document versions.

13. The system of claim 12, wherein identifying the priority associated with the sources of each document version of the plurality of different document versions comprises:

performing a lookup in a memory to identify the priority associated with each respective source of each respective document version of the plurality of different document versions.

14. The system of claim 12, wherein the priority associated with a particular one of the sources is based on a reputation of the particular one of the sources.

15. The system of claim 9, wherein the second type of metadata includes at least one of:

information identifying an author associated with the particular document version, information identifying a title associated with the particular document version, information identifying a publisher associated with the particular document version, a rank of the particular document version, or a quantity of other documents cited in the particular document version.

16. The system of claim 9, wherein the first type of metadata includes an address of a server that provides each document version of the plurality of different versions.

17. A non-transitory computer-readable medium storing software comprising instructions executable by one or more computers which, upon such execution, cause the one or more computers to perform operations comprising:

identifying a plurality of different document versions of a particular document;

identifying a first type of metadata that is associated with each document version of the plurality of different document versions, wherein the first type of metadata includes data that describes a source that provides each document version of the plurality of different document versions;

identifying, by the computer system, at least a second type of metadata that is associated with each document version of the plurality of different document versions, wherein the second type of metadata describes a feature of each document version of the plurality of different document versions other than the source of the document version;

for each document version of the plurality of different document versions, applying a priority rule to the first type of metadata and the second type of metadata, to generate a priority value generated for each document version of the plurality of different document versions;

selecting a particular document version, of the plurality of different document versions, based on the priority values; and providing the particular document version for presentation.

18. The computer-readable medium of claim 17, wherein selecting the particular document version comprises:

selecting the particular document version when a length of the particular document version exceeds a threshold length.

19. The computer-readable medium of claim 17, wherein selecting the particular document version comprises:

selecting the particular document version when the priority level of the particular document version exceeds a threshold priority level.

20. The computer-readable medium of claim 17, wherein applying the priority rule comprises:

identifying a priority associated with the source of each document version of the plurality of different document versions; and determining the priority value for each document version of the plurality of different document versions based on the identified priority associated with the source of each document version of the plurality of document versions.

21. The computer-readable medium of claim 20, wherein identifying the priority associated with the sources of each document version of the plurality of different document versions comprises:

performing a lookup in a memory to identify the priority associated with each respective source of each respective document version of the plurality of different document versions.

22. The computer-readable medium of claim 20, wherein the priority associated with a particular one of the sources is based on a reputation of the particular one of the sources.

23. The computer-readable medium of claim 17, wherein the first type of metadata includes an address of a server that provides each document version of the plurality of different versions.

\* \* \* \* \*